(12) United States Patent
Nemanick

(10) Patent No.: US 10,615,460 B2
(45) Date of Patent: Apr. 7, 2020

(54) LEAK DETECTION FOR BATTERIES

(71) Applicant: The Aerospace Corporation, El Segundo, CA (US)

(72) Inventor: Eric Joseph Nemanick, Santa Monica, CA (US)

(73) Assignee: The Aerospace Corporation, El Segundo, CA (US)

( * ) Notice: Subject to any disclaimer, the term of this patent is extended or adjusted under 35 U.S.C. 154(b) by 203 days.

(21) Appl. No.: 15/845,115

(22) Filed: Dec. 18, 2017

(65) Prior Publication Data

US 2019/0190085 A1 Jun. 20, 2019

(51) Int. Cl.
*H01M 10/42* (2006.01)
*H01M 10/0525* (2010.01)
*G01M 3/04* (2006.01)
*H01M 10/48* (2006.01)
*H01M 10/0568* (2010.01)

(52) U.S. Cl.
CPC ....... *H01M 10/4228* (2013.01); *G01M 3/042* (2013.01); *H01M 10/0525* (2013.01); *H01M 10/4285* (2013.01); *H01M 10/488* (2013.01); *H01M 10/0568* (2013.01)

(58) Field of Classification Search
CPC ......... H01M 10/4228; H01M 10/4285; H01M 10/488; H01M 10/0525; H01M 10/0568; G01M 3/042
See application file for complete search history.

(56) References Cited

U.S. PATENT DOCUMENTS

| | | | |
|---|---|---|---|
| 2007/0229294 A1* | 10/2007 | Vossmeyer | H01M 10/4207 340/636.19 |
| 2014/0174150 A1* | 6/2014 | Yajima | H01M 10/4228 73/23.2 |
| 2014/0316273 A1* | 10/2014 | Kery | A61B 5/0095 600/449 |
| 2015/0132620 A1* | 5/2015 | Sahner | H01M 10/052 429/90 |
| 2018/0261345 A1* | 9/2018 | Oehling | G21C 17/07 |
| 2019/0064154 A1* | 2/2019 | Lavis | C07D 405/14 |

* cited by examiner

*Primary Examiner* — Muhammad S Siddiquee
(74) *Attorney, Agent, or Firm* — LeonardPatel PC

(57) ABSTRACT

An apparatus for detecting leaks in batteries may include an applicator, and an indicator comprising a chemical configured to detect a trace amount of leakage in the battery.

11 Claims, 6 Drawing Sheets

LEAK DETECTION FOR BATTERIES

STATEMENT OF GOVERNMENT INTEREST

This invention was made with government support under Contract No. FA8802-14-C-0001 awarded by the Department of the Air Force. The government has certain rights in the invention.

FIELD

The present invention relates to detecting battery leaks, and more particularly, to detecting leaks in batteries by way of a chemical.

BACKGROUND

Batteries, and in some cases, lithium ion (Li-ion) batteries are a multibillion dollar industry. However, the cost of failed or dangerous batteries are sufficient to wipe out billions of dollars of market cap in a matter of days. For example, Samsung™ realized a $20 billion hit in the market due to a pair of battery recalls.

Currently, there are no efficient, effective methods or tools to detect small leaks in batteries such as Li-ion batteries. With Li-ion battery leaks, electrolytes leaking from the battery are highly flammable organic compound, and leave behind toxic and corrosive salts. These leaks may cause buildup of flammable vapors that can lead to devastating fires, short circuits, and personnel contact hazards.

Currently, leaks can be detected by examining surfaces with a microscope or loupe to find a pin hole, or in many cases, to use the human nose to smell around the battery to find the leak. However, none of these methods are particularly effective, accurate, or safe.

Thus, an effective and efficacious method for leak detection and localization, which does not require a laboratory or intensive training, may be beneficial.

SUMMARY

Certain embodiments of the present invention may provide solutions to the problems and needs in the art that have not yet been fully identified, appreciated, or solved by current battery leak detection techniques. For example, some embodiments generally pertain to detecting leaks in batteries.

In one embodiment, an apparatus may include an applicator, and an indicator comprising a chemical configured to detect a trace amount of leakage from the battery.

In another embodiment, it may be a tool for detecting a leak in a Li-ion battery. The tool includes an absorptive material comprising a chemical configured to detect electrolytes emanating from the Li-ion battery. The chemical may allow for a spatial resolution smaller than 1 mm.

In yet another embodiment, a leak detection tool may include an applicator that includes a chemical. The chemical may be applied to an external surface of a Li-ion battery. The applicator may detect presence decomposition products of electrolytes emanating from the Li-ion battery.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain a tool for detecting a leak in a battery such as a Li-ion battery. For purposes of explanation, the term "battery" will be used. In some embodiments, the tool uses a colorimetric indicator to detect electrolyte emanating from the battery. The tool may include an applicator and an indicator solution. In certain embodiments, the applicator may be a pen with a tip and/or dispenser, a cloth, Q-tip™, eye-dropper, spray, powder, coating, or film, to name a few.

The indicator solution may be composed of a chemical composition such as an aqueous iron thiocyanate complex. In some embodiments, the indicator solution may initially be a certain (or first) color and may change to a second color (or become colorless) when in contact with the electrolyte. The indicator may also change in property other than specifically color to demonstrate detection, such as a florescence or phosphorescence, conductivity, viscosity, light absorption or scattering, or magnetically. By using the applicator with the indicator solution, the spatial resolution for leak detection can be less than 1 mm. Furthermore, the leak does not need to be fresh, and the time period for detecting the leak can be more than several years after the leak.

Figure 1:
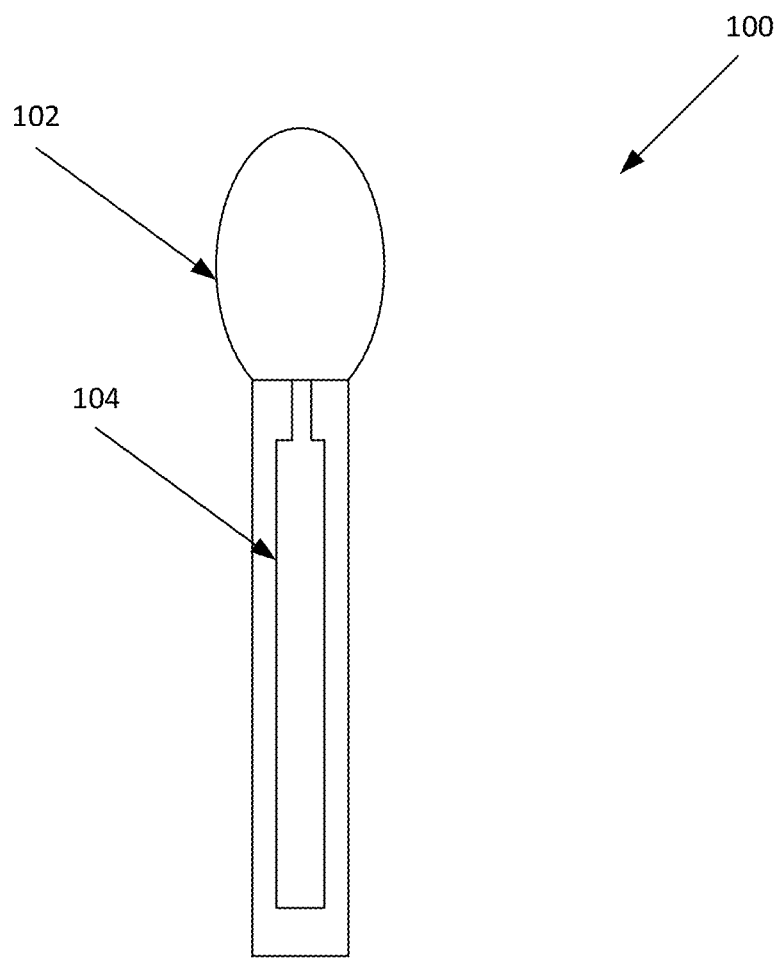
FIG. 1 is a diagram illustrating a tool for detecting a leak in the battery, according to an embodiment of the present invention.

FIG. 1 is a diagram illustrating a tool 100 for detecting a leak in the battery, according to an embodiment of the present invention. In some embodiments, tool 100 may include an absorptive material tip 102, which is connected to a reservoir 104 containing a chemical solution. The chemical solution may flow from reservoir 104 and to absorptive tip 102, when absorptive tip 102 is pressed against any area of the battery. In embodiments that do not include a reservoir 104, material tip 102 may be dabbed or soaked in a chemical solution for leak detection.

The chemical solution may be an aqueous solution in some embodiments. For example, the aqueous solution may be composed of 10 mM iron III nitrate ($Fe(III)(NO_3)_3$) and 10 mM potassium thiocyanate (KSCN). However, it should be appreciated that the indicator solution is not limited to a combination of iron III nitrate and potassium thiocyanate.

For example, the indicator solution may contain naphthalene-, amide-, salicyaldehyde-, silyl- or silane-based compounds. Also, the embodiments are not limited to an aqueous solution. For example, the solutions of indicators can be in organic solvents such as acetonitrile, dimethyl sulfoxide, ethers, esthers, alkanes, alkenes, halogenated, alcohols, and acids or mixtures of any of these. In addition, certain embodiments may not be liquidous in form, and may be composed of solids, polymers, or mixed phase materials including, gels, suspensions, mixtures, emulsions, sols, dispersions, foams, or aerosols.

Figure 2:
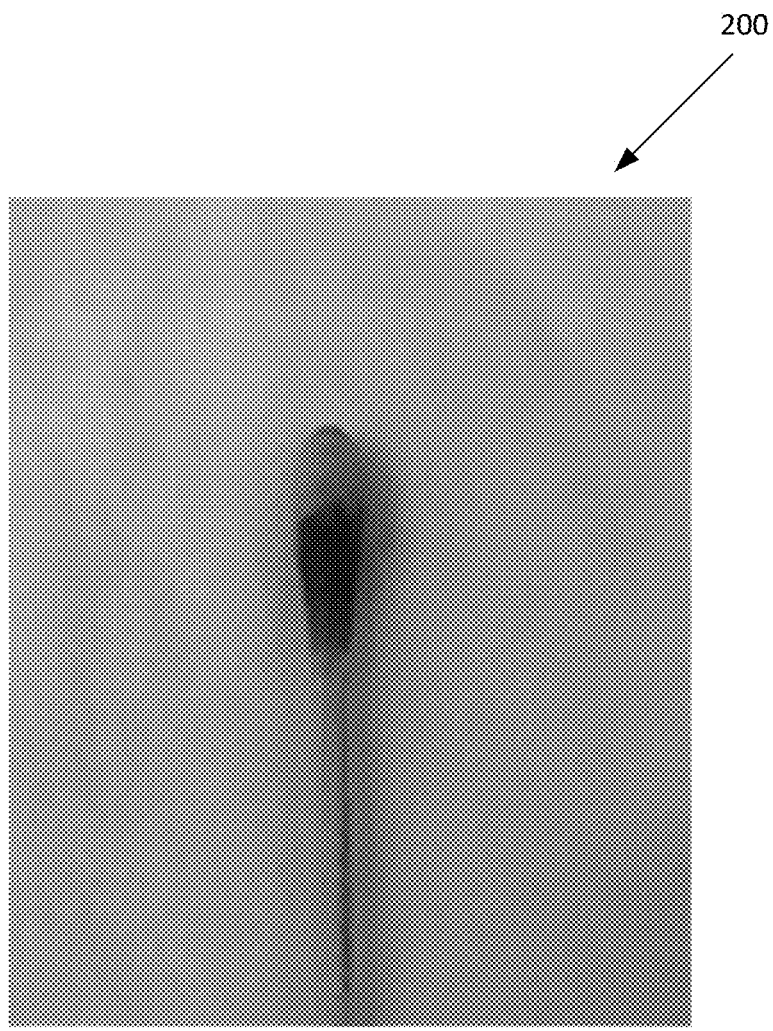
FIG. 2, for example, is an image showing a Q-tip with a bleached indicator solution, according to an embodiment of the present invention.

As noted above, the chemical solution may initially be a red solution, and may be bleached when in contact with electrolytes emanating from the battery. FIG. 2, for example, is an image 200 showing a Q-tip with the indicator solution, according to an embodiment of the present invention. In image 200, the Q-tip was rubbed in dried electrolyte changing the indictor solution from a first color to a second (or bleached) color indicating a leak in the battery.

With this embodiment, when the chemical solution makes contact with Li-ion battery electrolyte salt $LiPF_6$ (lithium hexafluorophosphate), absorptive material 102 of FIG. 1 may change from a first color (e.g., red color is from the chemical solution) to a bleached color (e.g., white color). See, for example, FIG. 2. It should be noted that the initial color of the solution is not limited to red, and may be any color depending on the composition of the chemical solution.

The aqueous solution may be a strong colorimetric detection system for fluoride components of Li-ion battery electrolytes. This aqueous solution, when in water, reacts with the hexafluorophosphate ions ($PF_6^-$) of the electrolyte to first generate small amounts of fluoride ions. These small amounts of fluoride ions then bind to the iron complex of the aqueous solution, changing the color of the aqueous solution. The water for reaction with the electrolyte salts can also come from ambient humidity, as well as from the detection tool.

In some embodiments, absorptive material 102 may be dragged over the battery surface to monitor for signs of bleaching the initial color of the chemical solution on absorptive material 102. Tool 100 may be accurate for detecting active leaks in Li-ion cells, as well as electrolyte residue from past leaks.

The following is an example of a chemical reaction showing hexafluorophosphate ions from the electrolyte bleaching the indicator solution of FIG. 1.

First, $LiPF_6$ reacts with $H_2O$ to produce $F^-$ ions, which is a ligand for metals.

Using the indicator solution, i.e., an indicator of iron thiocyanate, the indicator is bleached in the presence of fluoride ions.

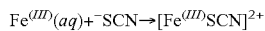

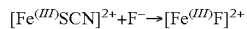

The combination of a ligand such as thiocyanate ($SCN^-$), with a transition metal ion such as iron III ($Fe^{3+}$), forms a complex where the two ions associate closely and share electrons. This sharing can lead to strong light and color absorption, as electrons from the iron ion can absorb photons of a certain wavelength (color) of light and the electron can then transfer to the ligand. This light absorption can be quite strong and impart a vibrant color to the complex. If the destination ligand for this electron transfer is displaced in the complex by a ligand that cannot accept an electron, such as fluoride ($F^-$), the complex will no longer absorb light and appear to be bleached or colorless.

Figure 3:
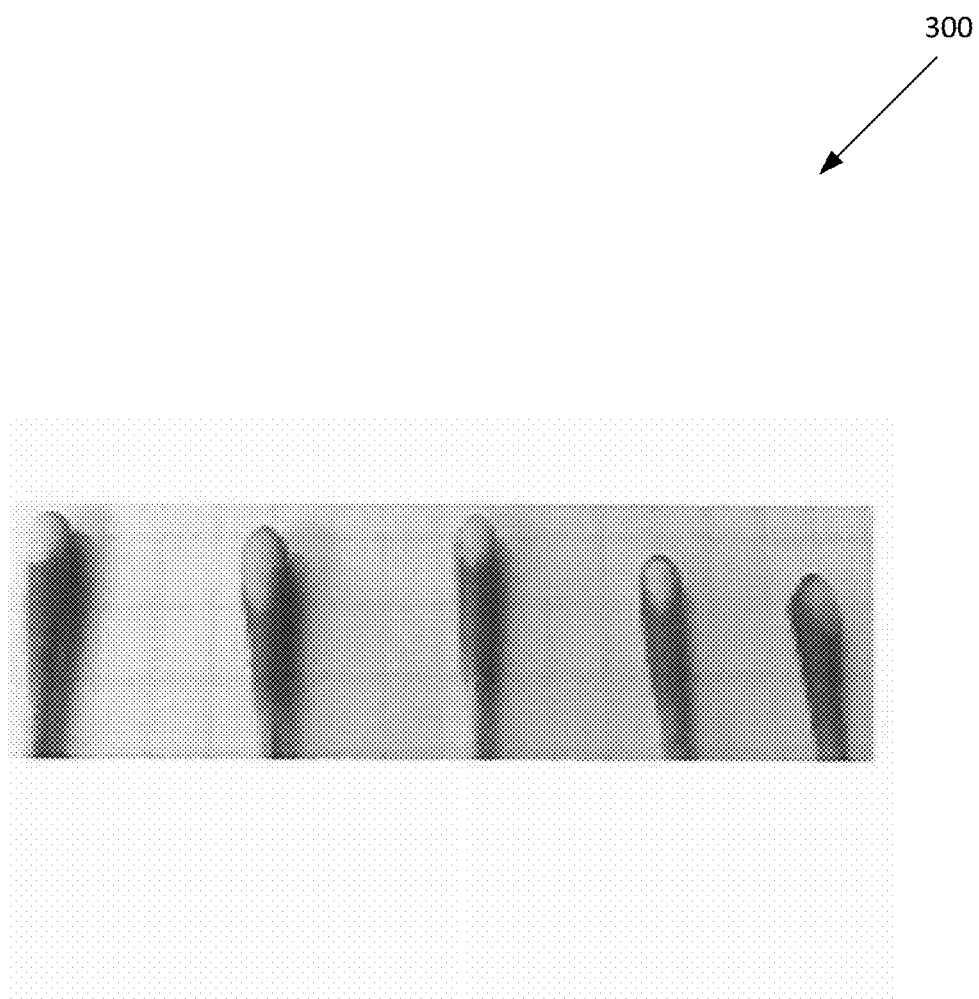
FIG. 3 is an image illustrating bleaching of an indicator after exposure to electrolytes from a Li-ion battery, according to an embodiment of the present invention.

FIG. 3 is an image 300 illustrating bleaching of an indicator after exposure to electrolytes from a Li-ion battery. In FIG. 3, between 100 and 5 μL of electrolyte were dried on a surface, and the indicator tool was applied to detect the residue. Even at 5 μL, the indicator tool shows a strong response. Image 300 shows that the indicator solution is extremely sensitive for detection of a leak in a Li-ion battery, for example.

Figure 4:
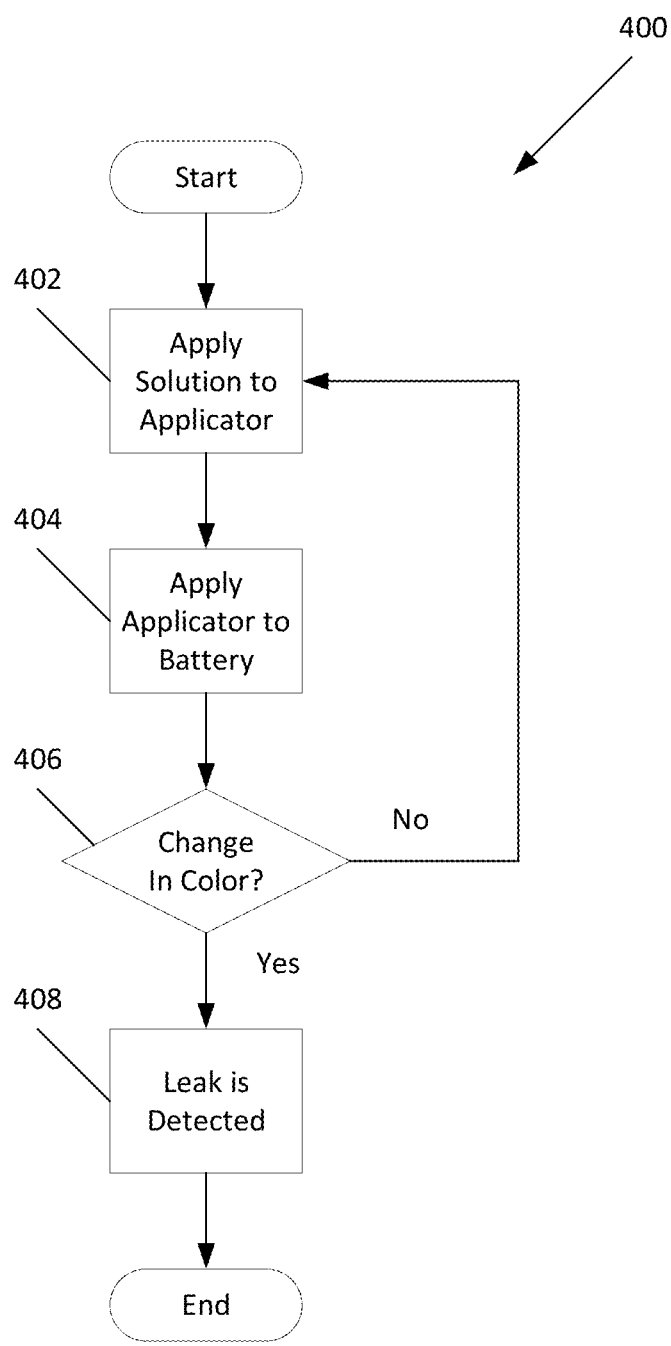
FIG. 4 is a flow diagram illustrating a process for detecting leak in the battery, according to an embodiment of the present invention.

FIG. 4 is a flow diagram illustrating a process 400 for detecting leak in the battery, according to an embodiment of the present invention. In some embodiments, process 400 begins at 402 with applying an aqueous solution to an applicator (or tool). At 404, the applicator is moved across a specific area or the entire area of the battery. At 406, determine if the applicator has undergone a change in color, and if the applicator changed colors, then at 408, a leak is detected. Otherwise, the process may return to step 404.

Figure 5:
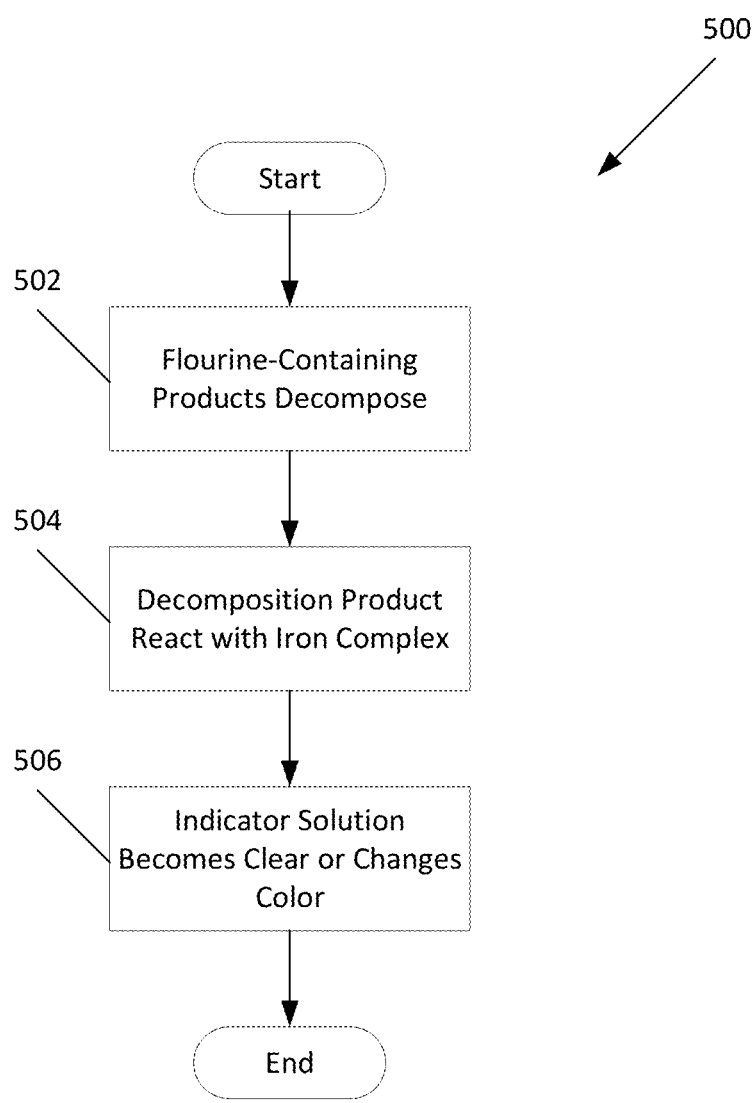
FIG. 5 is a flow diagram illustrating a process showing a change in chemical reactivity and color when aqueous solution is in contact with an electrolyte, according to an embodiment of the present invention.

It should be noted that Li-ion battery electrolyte may be composed of fluorine-containing compounds. FIG. 5 is a flow diagram illustrating a process 500 showing a change in chemical reactivity and color when aqueous solution is in contact with an electrolyte, according to an embodiment of the present invention. In some embodiments, at 502, the fluorine-containing compounds partially decompose in the presence of water to generate decomposition products, one of which is the fluoride ion, ($F^-$). At 504, these decomposition products react with an iron complex, and change the optical properties of the complex. At 506, the indicator solution becomes clear as the light absorbing portions of the complex are displaced or partially displaced. In an alternative embodiment, the indicator solution may change color as the light absorption band shifts.

Figure 6:
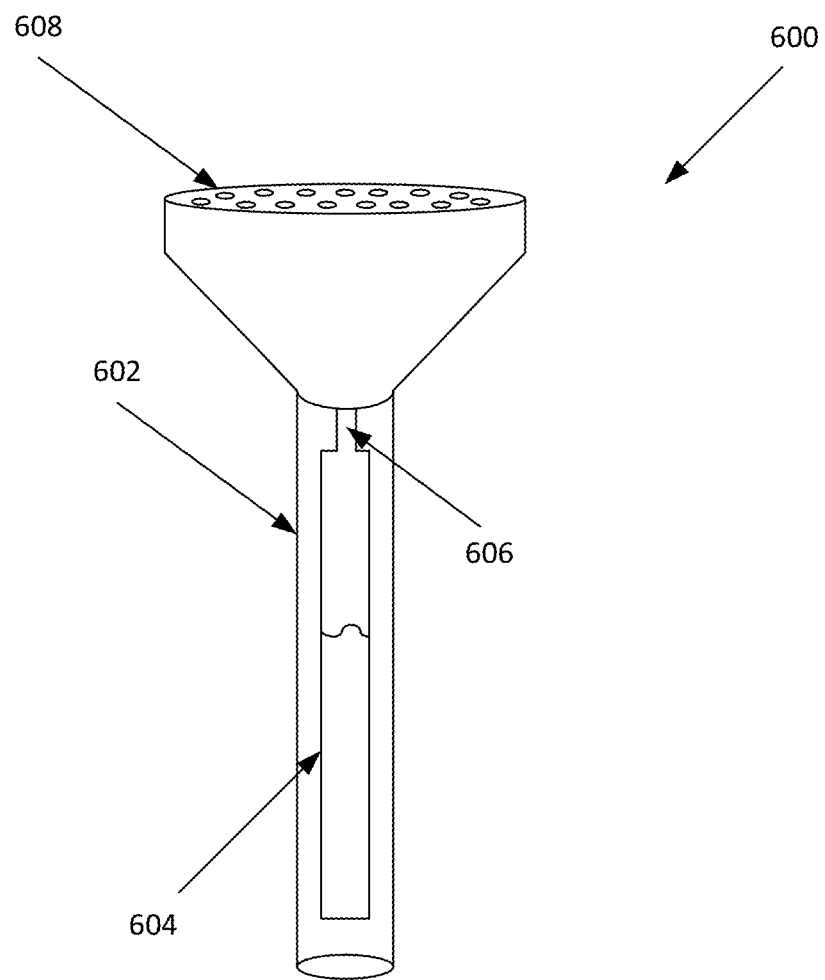
FIG. 6 is a diagram illustrating a dispenser for dispensing the chemical solution over a Li-ion battery, according to an embodiment of the present invention.

As discussed above, the embodiments for applying the chemical solution to the Li-ion battery are not limited to a Q-tip. For example, in some embodiments, a dispenser may be used to dispense the chemical solution. FIG. 6 is a diagram illustrating a dispenser 600 for dispensing the chemical solution over a Li-ion battery, according to an embodiment of the present invention. In an embodiment, dispenser 600 may include a handle 602. In some embodiment, handle 602 may include a reservoir 604 for storing the chemical solution. Handle 602 may be composed of plastic material or any material that would be appreciated by a person of ordinary skill in the art. In some further embodiments, all of, or a portion of, handle 602 may be transparent to allow monitoring of the chemical solution level. When dispenser 600 is pressed against Li-ion battery, the chemical solution may be dispensed through a channel 606 and out from exit valves (or applicator) 608. Exit valves 608 may include rubber material extending from dispenser 600 allowing the chemical solution to be applied onto the Li-ion battery.

In another embodiment, a cloth soaked in the chemical solution may be used. This cloth may then be placed over and pressed against the Li-ion battery for leak detection. For example, when the cloth is pressed against the Li-ion battery, a color change in, or in certain areas of, the cloth may identify the location of the leak on the Li-ion battery. Put simply, one of ordinary skill in the art would appreciate that the delivery mechanism is not limited to a Q-tip, dispenser, or a cloth, but may be any type of delivery mechanism that would aid in dispensing or using the chemical solution to identify leaks in the Li-ion battery.

Chemical detection processes, such as discussed here, do not require the application of a current, voltage, or other electrical properties, and are not typically measured using the same. Electrical detection typically requires electrodes and conductive elements as a part of the detection system, and typically will not work if the leak area has dried. Thus, the embodiments described herein may be more beneficial than conventional electrical detection systems.

Some embodiments generally pertain to a leak detection tool that uses a colorimetric indicator to detect residual electrolyte salt at a leak location. This tool may find leaks in Li-ion batteries, and provide for quality control and failure analysis for Li-ion battery manufacturers and service agents. Also, in some embodiments, the tool may detect presence of fluoride ion ($F^-$) from the decomposition of the electrolyte emanating from the Li-ion battery. For example, fluoride ion ($F^-$) may selectively change the color of an indicator solution without cross reactivity, and eliminate the light absorbance of an iron complex or another indicator causing the visual bleaching or other color change of the indicator solution. This tool may help localize the leak area compared to whole battery leak detection techniques such as vacuum checks and gas analysis sampling.

This tool may be developed as a product for sale to battery manufacturers, electronic repair businesses, mobile phone companies, electric car manufacturers, airline maintenance groups, or any business that maintains, inspects, or builds devices that contain Li-ion batteries. This tool provides a fast and accurate test of leakage in batteries, enabling non-experts to test the battery for hazardous leaks at any given time.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A tool for detecting a leak in a lithium ion (Li-ion) battery, comprising:
    an absorptive material comprising a chemical configured to detect with spatial resolution electrolytes currently and/or previously emanating from the Li-ion battery when the absorptive material makes contact with a surface of the Li-ion battery, wherein
    a chemical reaction allows for the spatial resolution of electrolyte presence smaller than 1 mm.

2. The tool of claim 1, wherein when the chemical makes contact with lithium hexafluorophosphate, the absorptive material changes from a first color to a second color indicating leakage from the battery.

3. The tool of claim 2, wherein when water in the adsorbed chemical reacts with the electrolyte salts, a small amount of fluoride ions is generated,
    the small amounts of fluoride ions bind to an iron complex of the chemical, changing the color of the absorbed material.

4. The tool of claim 1, wherein the chemical comprises iron III nitrate and potassium thiocyanate.

5. The tool of claim 4, wherein the chemical further comprises naphthalene-, amide-, salicyaldehyde-, silyl- or silane-based compounds.

6. The tool of claim 1, wherein the chemical comprises acetonitrile, dimethyl sulfoxide, ethers, esters, alkanes, alkenes, alkynes, polymer, amines, aldehydes, ketones, imines, transition metals, silicons, aromatics, halogenated compounds, alcohols, acids, or any combination thereof.

7. The tool of claim 1, wherein the chemical changes color from a first color to a second color when in contact with electrolytes.

8. The tool of claim 1, wherein the chemical is bleached when in contact with lithium hexafluorophosphate.

9. The tool of claim 1, further comprising:
    a reservoir containing the chemical, wherein
    the chemical flows from the reservoir and onto the absorptive material when the absorptive material is pressed against any area of the Li-ion battery.

10. The tool of claim 1, wherein the absorptive material is dabbed or soaked in the chemical prior to performing leak detection.

11. The tool of claim 1, wherein the absorptive material is affixed to or adjacent to the battery prior to a leak and can indicate a leak as or after it occurs.

* * * * *